Patented Dec. 2, 1941

2,264,328

UNITED STATES PATENT OFFICE 2,264,328

PROCESS OF PRODUCING IRON FREE MIXTURES OF SELENIUM AND SULPHUR

James J. O'Brien, Baltimore, Md., assignor to The Glidden Company, Cleveland, Ohio, a corporation of Ohio No Drawing. Application November 21, 1938, Serial No. 241,634

9 Claims. (Cl. 23—209)

The present invention relates to the purification and recovery of selenium from crude selenium containing materials.

Selenium is ordinarily obtained from the residues resulting from the treatment of various ores, such as the electrolytic refining of copper from chamber acid works, etc., and as obtained usually contains iron along with other impurities and frequently sulphur. Among the uses of selenium are the manufacture of pigment, glazes, etc., and it is desirable that the iron and other impurities be removed in order that clear bright colors can be obtained.

According to the present invention a simple easy method is provided for recovering the selenium free from iron and other harmful impurities. The selenium recovered is likewise in a form in which it is readily useful in the manufacture of pigments.

According to the invention the selenium residues or crudes are treated with boiling mineral acids in the presence of elemental sulphur. In case a crude containing sulphur is used the addition of sulphur may not be necessary. In those cases in which the crude contains no sulphur, the sulphur is added. At the boiling point of the acid the selenium containing some sulphur is precipitated in the form of a black plastic mass, iron and other impurities remaining in the acid solution. The precipitate of selenium-sulphur is easily recovered by decantation, and upon cooling becomes hard and brittle. This black amorphous solid is capable of being readily pulverized and is very soluble in soluble sulphide solutions such as barium and sodium sulphide solutions.

The selenium sulphur crude does not dissolve in the acid but starts to melt at 70° C. forming a plastic mass intermingled with unmelted crude; at 190° C. black globules appear which finally settle out; at 235° C. liquefaction starts and from 235° C. to 260° C. the liquefaction and separation of the amorphous sulphur-selenium mixture is completed. The precipitate may be described as an amorphous mixture of selenium and sulphur which when cooled is in a solid brittle form but not crystalline.

The phenomenon is considered to be a physical change and not a chemical change. The selenium and sulphur melt under the acid, preventing losses of selenium by volatilization, and at the same time the impurities are removed by the action of the acid, either in solution or as insolubles readily separated from the selenium-sulphur precipitate. It so happens that the boiling points of sulphuric acid, varying according to the concentration from 170° C. to 340° C. are well above the melting points of the selenium in the crude which starts to melt at about 70° C. and is completely liquefied from 235° C. to 260° C. It should be understood that the melting point of pure selenium is considerably less; about 217° C. As the liquefied selenium sulphur cools it solidifies in the bottom of the tank. When it is sufficiently cooled the acid is run off and may be treated for the recovery of other materials such as cadmium, if present. A sludge of sulphate concentrate on top of the selenium sulphur mixture is flushed out with water leaving the selenium mixture. The mixture of selenium and sulphur is then melted and may be poured from the tank into pans where it is allowed to cool in the air. It is then pulverized when ready for use.

An analysis of a typical sulphur-selenium crude treated in accordance with the present invention is as follows:

| | Per cent |
|---|---|
| Selenium | 58.6 |
| Sulphur | 19.52 |
| Iron | 3.06 |
| Insoluble | 19.36 |

Example I

To 750# of a crude residue containing selenium, sulphur, iron and other impurities was added 2,130# of 60° Baumé sulphuric acid in an iron kettle and the mixture heated to boiling, the final temperature being 260° C. A black plastic mass formed which on being chilled in water became hard and brittle. The iron remain in solution, and the selenium-sulphur mass was easily recovered by decantation, which was readily washed free of any remaining solution and sulphate residue. The selenium sulphur mass analyzed 82.59% selenium and 17.6% sulphur and weighed 548#.

Example II

To 750# of crude residue containing selenium, sulphur, iron and other impurities was added 2,130# of 60° Baumé sulphuric acid and the mixture brought to a boil. The final temperature was 240° C. and the total time 4½ hours. The 698# of a sulphur-selenium mixture recovered analyzed 79.81% selenium and 20.19% sulphur.

Example III 1 gram of sulphur was intimately mixed in a mortar with 2 grams of pure selenium and treated with 25 cc. of 60° Baumé sulphuric acid diluted with 25 cc. of water. The dilute acid containing the selenium sulphur mixture was brought to a boil and after about two minutes the selenium containing sulphur formed a black plastic mass and settled out of the acid. The acid solution was decanted and the selenium containing sulphur mass, on being chilled formed a brittle black solid.

Example IV 50 grams of crude residue containing selenium, sulphur, iron and other impurities was heated with 40 cc. of 85% aqueous phosphoric acid and the acid brought to a boil, the final temperature being 240° C. 44 grams of a selenium-sulphur mixture were recovered analyzing 77.96% selenium and 22.04% sulphur.

A boiling temperature of 240° C. of the acid has given satisfactory results in recovering the selenium-sulphur mixture; however, a wider range of 235° C. to 260° C. will give just as good results. These temperatures are above the melting point of selenium, which is about 217° C. However, due to the presence of impurities in the crude material which retard the melting and separation of the selenium-sulphur mixture, these higher temperatures are preferred.

The procedure has many advantages. It is simple and does not require elaborate apparatus. The precipitate due to its large size is readily recovered and can be easily washed free of other solids and of any of the acid solution containing impurities. Upon cooling the brittle mass can readily be reduced to a finely powdered state in which form it may be readily dissolved. Such solvents may be soluble sulphide solutions, which solutions can be used in the manufacture of pigments in accordance with such methods as that of the O'Brien Patent No. 1,894,931. The cooled mass or the pulverized material may be shipped to users or stored until needed, or the pulverized material may be used immediately. In any event the recovered selenium is in a form in which it can be readily used and handled. The selenium-sulphur mixture recovered has been found to ordinarily contain from about 13 to 25% sulphur and from about 75 to 87% selenium.

The invention is considered to reside in the method as well as in the product recovered, which is in an easily usable form. Another aspect of the invention is a method of treatment whereby selenium is produced in an easily usable form.

Having described my invention, what I claim is:

1. The process of producing a mixture of selenium and sulphur substantially free from acid soluble impurities which comprises dispersing a selenium residue containing acid soluble impurities in a mineral acid having a boiling point sufficiently high to permit heating of the dispersion to a temperature at which selenium and sulphur content will liquefy, said dispersion also containing sulphur, heating the dispersion sufficiently high to liquefy the selenium and sulphur, and continuing the heating until the selenium is separated as a plastic mass of selenium and sulphur.

2. The process of producing substantially iron free mixture of selenium and sulphur from a mixture comprising selenium, sulphur, iron and other impurities which comprises adding to said mixture a mineral acid having a boiling point sufficiently high to permit heating of the resulting mass to a temperature at which selenium and sulphur content will liquefy, boiling said mass at temperature sufficiently high to cause liquefaction of the selenium and sulphur until a plastic mass of selenium containing sulphur separates.

3. The process of producing substantially iron free mixture of selenium and sulphur from material comprising selenium, sulphur, iron and other impurities which comprises mixing sulphur with said material and adding to said mixture a mineral acid having a boiling point sufficiently high to permit heating of the resulting mass to a temperature at which selenium and sulphur content will liquefy, boiling said mass at temperature sufficiently high to cause liquefaction of the selenium and sulphur until a plastic mass of selenium containing sulphur separates.

4. The process of producing substantially iron free mixture of selenium and sulphur from material comprising selenium, iron and other impurities which comprises mixing sulphur with said material and adding to the resulting mixture a mineral acid having a boiling point sufficiently high to permit heating of the resulting mass to a temperature at which selenium and sulphur content will liquefy, boiling said mass at temperature sufficiently high to cause liquefaction of the selenium and sulphur until a plastic mass of selenium containing sulphur separates.

5. The process of producing substantially iron free mixture of selenium and sulphur from a selenium residue comprising sulphur and iron which comprises adding to said residue a mineral acid having a boiling point sufficiently high to permit heating of the resulting mass to a temperature at which selenium and sulphur content will liquefy, boiling said mass at temperature sufficiently high to cause liquefaction of the selenium and sulphur until a plastic mass of selenium containing sulphur separates, separating the plastic mass from the acid solution and cooling the plastic mass.

6. The process of claim 2 in which the mineral acid is sulphuric acid.

7. The process of claim 2 in which the mineral acid is phosphoric acid.

8. The process of producing substantially iron free mixture of selenium and sulphur from a selenium residue containing sulphur, iron and other impurities which comprises adding to said residue a mineral acid having a boiling point sufficiently high to permit heating of the resulting mass to a temperature at which selenium and sulphur content will liquefy, boiling said mass at temperature of approximately 235° to 260° until a plastic mass of selenium containing sulphur separates.

9. The process of producing substantially iron free mixture of selenium and sulphur from a selenium residue containing sulphur, iron and other impurities which comprises adding to said residue a mineral acid having a boiling point sufficiently high to permit heating of the resulting mass to a temperature at which selenium and sulphur content will liquefy, boiling said mass at approximately 240° C. until a plastic mass of selenium containing sulphur separates.

JAMES J. O'BRIEN.